Jan. 3, 1933.  B. OBER ET AL  1,893,437
METHOD OF PRODUCING PHOSPHATIC FERTILIZERS
Filed Sept. 20, 1929  2 Sheets-Sheet 1

Inventors
B. OBER,
W. W. PAGON,
G. L. PRUETT
AND W. W. TROXELL
By Semmes & Semmes
Attorneys

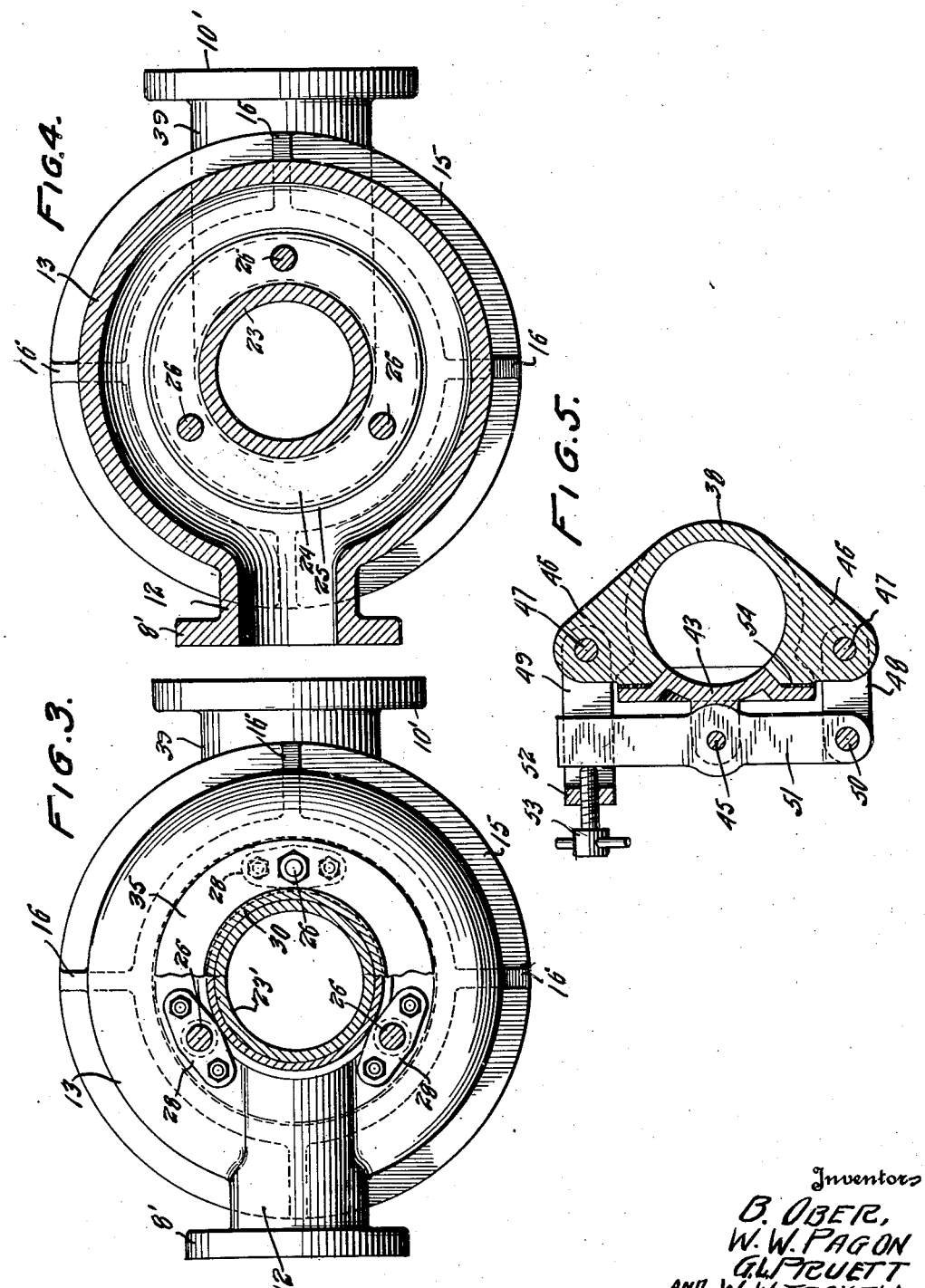

Patented Jan. 3, 1933

1,893,437

UNITED STATES PATENT OFFICE

BEVERLY OBER, WILLIAM W. PAGON, GEORGE L. PRUETT, AND WILLARD W. TROXELL, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

METHOD OF PRODUCING PHOSPHATIC FERTILIZERS

Application filed September 20, 1929. Serial No. 394,130.

This invention relates to the production of fertilizers and more particularly to an improved method of producing phosphatic fertilizers.

The present invention is an improvement on the method of and apparatus for preparing acid phosphates described in application Serial No. 304,789.

The improved method of preparing phosphatic fertilizer as described in the application referred to, comprises essentially the charging of finely divided unavailable phosphatic material and an acid to a compounding zone wherein respectively predetermined quantities of acid and dust are admixed in a constant ratio. From the compounding stage the mixture is passed to a receiving and conversion stage wherein the unavailable phosphatic material is converted to available forms under controlled conditions of temperature and super-atmospheric pressure. After the conversion step the conditions in the conversion stage are readjusted to insure crystallization and drying of the mass.

The present method is concerned particularly with the charging of the acid and rock and its broadest aspect comprehends a new and highly effective method of compounding the reactive ingredients and a novel apparatus for carrying out this method.

In order to more clearly explain the invention, a mechanical embodiment of it is shown, by way of illustration, in the accompanying drawings, in which.

Figure 1:
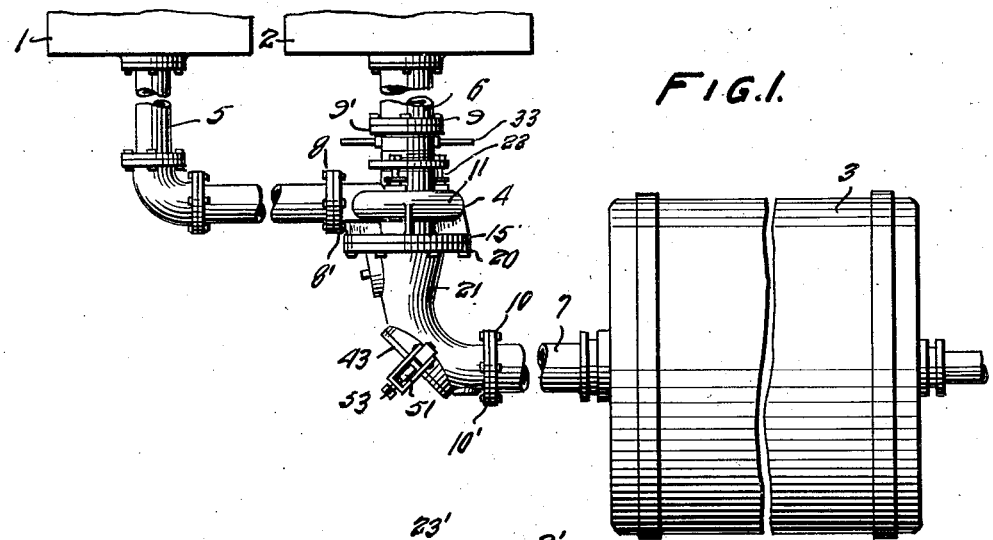
Fig. 1 is a perspective view of the charging device and receiving stage.

Figs. 3, 4 and 5 are sections taken on lines 3—3, 4—4, and 5—5 respectively of Fig. 1.

In the prior application referred to, the charging was accomplished by impinging streams of acid and dust, in a Venturi jet, in such a manner that the stream of acid, under pressure, aspirated the stream of dust. The flow of the dust was further insured by utilizing a positive pressure thereon and providing means for agitating it.

The charging method of the present invention comprises causing a stream of dust to flow toward the receiving stage and at a point intermediate the dust hopper and the receiving stage, to enclose or encompass the stream of dust with a so-to-speak conoidal stream of acid. Refinements of the method include the provisions for regulating the volumes of the respective flows and for increasing the mixing effect by appreciably increasing the turbulence of the mass in transit.

In the preparation of phosphatic fertilizers, it is highly advantageous to insure a thorough mixture of the rock dust and the acidulating agent. The present method involves the extenuation of the acid into a continuous film or atomized cloud of maximum surface area and the general conformation of the stream of dust to the configuration of the acid film, so as to obtain optimum contact surface conditions thereby insuring a rapid and thorough incorporation of the reactive components. In this manner, the wetting power of a given volume of acid is completely utilized and the tendency to heterogeneity or unequal distribution of acid in the mix is substantially eliminated.

Such a process may effectively be carried out by the apparatus shown in the accompanying drawings, although it will readily be appreciated that this process very readily lends itself to the employment of other widely variant forms.

As shown, the major mechanical elements involved in the process comprise an acid tank 1 and dust hopper 2 communicating with the autoclave 3 through the novel charging device, designated generally by the numeral 4. The hopper and autoclave may be of any desired type, such for example, as are described in copending applications Serial No. 304,789, filed Sept. 8, 1929, or Serial No. 393,826 filed Sept. 19, 1929. The acid and dust hoppers, of whatever type, communicate with the charging device 4 through the discharge lines 5 and 6 respectively. These lines are shown as broken away in the drawings to indicate that the hoppers may be positioned at any convenient distance from the charging device.

The receiving stage, which is preferably a rotary autoclave, is connected to the efflux end of the charging device by a line 7. In the preferred mechanical embodiment of the invention the line 7 is connected to the autoclave on its axis of rotation and suitably gasketed. The lines 5, 6 and 7 are each provided with collars 8, 9 and 10 which respectively abut the corresponding securing flanges 8', 9' and 10' formed on the inlet and outlet openings of the charging valve.

Figure 2:
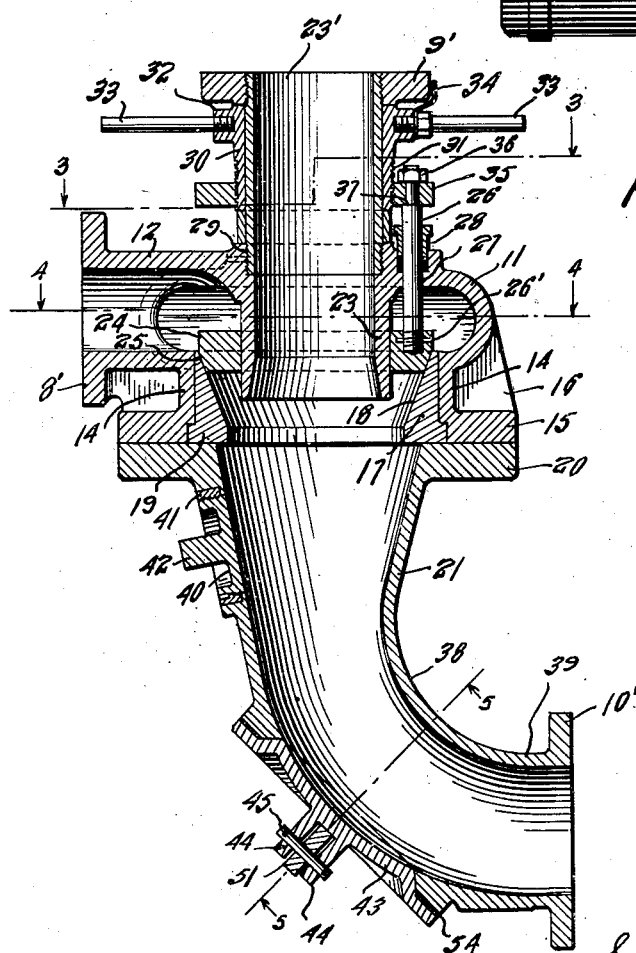
Fig. 2 is an enlarged longitudinal section of the compounding device.

As noted above, the charging device comprises essentially means for extenuating a solid stream of acid into a hollow stream or spray of maximum surface area and means to direct a conformed stream of dust into the interior of the hollow stream of acid. These means are so designed as to impart directional characteristics to the two streams so as to provide optimum incorporation of the two materials. The device additionally includes means to insure the maximum turbulence of the moving mass compounding with a practical minimum of frictional resistance.

Such an association of elements is shown particularly in Fig. 2. The charging valve comprises a body portion 11 which includes two channels, an induction channel for the acid and an eduction channel for the mixture of acid and dust. The induction channel is formed by extending the pipe section 12 in a toroidal shape, as shown in Fig. 4 so as to provide, in effect, a circular wall 13 connected to the bottle neck 12. The sides of the wall 13 are semicircular in cross section. The lower section of this wall is extended downwardly, as at 14, and is extended laterally at the base to form the securing flange 15. Extending between the flange 15 and curved walls 13 are the spaced rigidifying flanges 16.

Associated with the induction channel of the valve is a member in the nature of a valve seat, which serves to direct the flow of the conoidal acid stream. This comprises a seat 17 having an interior surface 18 tapered on the desired angle. The exterior vertical surface of the member 17 closely abuts the contiguous face of the wall 14 of the valve body and is held against displacement by the engagement of its projecting shoulder 19 with the valve body. The bottom of the valve body and the seat rest upon the flange 20 formed on the spout 21. These two members are securely fastened together by any suitable attaching means such as the bolt and nut construction 22.

The valve body is also provided with means for extenuating the acid stream and for admitting a stream of dust. In the preferred modification this comprises in effect an integral hollow tube 23 extending from the upper surface of the valve body downwardly into the valve body to a part adjacent the seat 19. While this member is shown as being integral with the body, it is obvious that it might be made up as a separate member and then attached to the body in any desired manner.

It will be seen from an inspection of Figs. 2 and 4 that the member 23 in association with the valve wall 13 forms a circular channel for the stream of acid entering the pipe 12 and that if a continuous circular opening is provided between the channel and the seat 19, the acid will flow through the latter in the form of a hollow cone.

In accordance with the principles set forth, means are provided to cause the acid to flow downwardly in the form of a cone of a thin film or spray which then contacts with the dust. This means may take the form of a vertically adjusted member 24 which, upon vertical displacement, varies the opening between the circular induction channel and the valve seat to regulate the thickness of the cone of acid which impinges on the enclosed cone of dust. As shown, this member comprises a metallic ring, the interior face of which has sliding engagement with the tube member 23. On its exterior face, the ring is tapered as at 25 to conform to the taper of the face 18 of the valve seat. At spaced points on its upper periphery, the ring is screw threaded to receive the bolt members 26, which are held in position by the lock pins 26′. These bolts pass through the apertures 27 in the valve body and stuffing boxes 28.

As indicated above, the tube or channel 23 communicates with a source of dust supply. As shown, particularly in Fig. 2, the upper end of the tube section 23 is internally threaded at 29 and received therein the corresponding external threads on the tube extension 23′. At its upper end the extension 23′ is also externally threaded to receive the correspondingly threaded securing flange 9′ by means of which the charging valve is connected to the discharge line from the dust hopper.

The tube extension 23′ serves to support an adjustment means for the displaceable ring 24. This comprises a sleeve 30 surrounding the tube extension 23′ and held against vertical displacement by the overlying projections on the valve body and flange 9′. This sleeve, while immovable vertically, is movable circumferentially of the tube extension 23′. On its exterior surface the sleeve is screw threaded at 31 and at its upper section is formed with the internally threaded lugs 32. Secured in these lugs are the operating handles 33. A pointer 34 is secured to one of the handles and cooperates with a calibrated scale (not shown) on the adjacent rim of the flange 9′.

Use is made of the potential rotary movement of the sleeve 30 to displace the ring 24 vertically so as to vary the circular opening between it and the seat 19, and thereby regulate the flow of acid downwardly into the spout. A collar 35 formed with internal threads engages the threaded section of the sleeve 30. As shown in Figs. 2 and 3, the bolts 26 are secured at the upper ends to this collar by means of the nuts 56 and shoulder abutments 37, or any other equivalent means.

It will be seen that circumferential displacement of the handles 33, the amount of which is indicated by the pointer 34 and associated scale, will rotate the sleeve 30 and cause the collar 35 to move vertically. This vertical movement is transmitted to the ring 24 through the connecting bolts 26 to vary the space between it and the seat 19.

It will be understood that the scale on the flange 9' may be calibrated in any desired units, such as distance, speed of flow, etc. It will be appreciated therefore that by manipulation of the operating handles 33, the quantity of acid admitted to the compounding zone may be varied. Similarly this adjustment governs the thickness of the acid cone. By varying the hydrostatic head or pressure on the acid and conal thickness in the valve, an accurate regulation of the compounding process may be achieved.

As noted above, the charging valve is connected at its discharge end to the autoclave and in this discharge is provided means to impart an added turbulence to the mixture. This additional agitation is attained by the design of the spout 21, connected to the efflux end of the valve. As shown, this member is secured through the flange 20 to the base flange 15 on the valve body. This member tapers inwardly from its port of attachment to the valve body, is then curved, at the section 38, and terminates in the substantially straight portion 39, the axis of which is in a plane substantially normal to the direction of flow of the mixture discharged from the valve proper. In such a structure the mixture is ejected forcibly from the valve and upon impingement on the subtended curved portion is given an added turbulence which facilitates the mixing of the ingredients.

Adjacent its point of connection with the valve body, the spout is provided with a manhole cover 40 screw-threaded into the bronze bushing 41. The stem 42 of the cover may be squared otherwise conventionally shaped to provide for the reception of a wrench. The inner surface of the manhole is curved to conform to the shape of the spout. The provision of the manhole presents a ready inspection and cleaning of the interior of the valve.

Adjacent the discharge end of the spout and positioned on the curved section is a hand hole cover designated generally by the numeral 43. As shown in Figs. 2 and 5, this is formed with the integral bifurcations 44 which are apertured to receive the pivot pin 45. The body of the spout adjacent the manhole is extended to provide the projecting lugs 46 (Fig. 5). These lugs are apertured to receive the pins 47 upon which are mounted the links 48 and 49. Pivoted to the link 48, by means of a pivot pin 50, is a bar 51. At its median portion this bar is apertured to receive the pivot pin 45, mounted as explained on the cover. The link 49 is preferable of slotted construction to loosely receive the bar 51, as shown in Fig. 5. The upper closed end 52 of the slotted link 49 is screw threaded to receive the locking bolt 53. The inner surface of the cover 43 is curved to conform to the curvation of the spout. Interposed between the cover and body of the spout is a sealing gasket 54, composed preferably of rubber.

It will be seen that the cone may be swung into open position by turning the locking bolt 53 in the proper direction to unlatch the bar 55 and then swing the link 49 clear to permit the pivotal movement of the bar 51 and withdrawal of the cover from closed position. The hand hole, it will be noted, is so positioned that it permits inspection of and access to both the channel of the spout extending from the valve and the discharge end of the spout and its connected line 7. The means therefore permits the cleaning of the entire discharge line.

The spout 21 and associated covers 40 and 43 may, if desired, be made of cast iron. The invention, however, is not limited to the use of any particular materials, as any found convenient or desirable may be used. Similarly the invention is not limited to any particular design of the several cooperating parts of the device.

It will be understood that the line connecting the discharge end of the mixing valve and the autoclave is provided with a control valve, such for example as is explained in copending application Serial No. 393,791, filed Sept. 19, 1929.

The operation of the assemblage is similar to that described in the copending application Serial No. 304,789 above referred to. The acid tank and dust hopper are supplied with acid and dust respectively, taken from storage points. In order to insure a positive flow a hydrostatic pressure may be placed upon the acid tank and also upon the dust hopper. This pressure may be supplied from a suitable compressor, connected through the intermediacy of the reservoir, to the acid tank and the dust hopper. If desired, the acid tank may be provided with a heating coil so as to regulate the temperature of the acid employed.

When it is desired to charge the autoclave or other receiving apparatus, the control valve, which is positioned between the discharge end of the spout and the intake to the autoclave, is closed and the vacuum pump set in operation. This places the autoclave under a partial vacuum. When the desired vacuum is attained, which in most runs is approximately ten inches, the control valves (not shown) in the acid and dust lines and the control valve in the discharge line from the charging valve are opened. Due to the positive pressure upon the acid and dust, and supplemented by the reverse pressure in the autoclave, the ingredients are rapidly charged to the receiving stage. It has been found in practice that it is desirable to continue the operation of the vacuum pump during the charging stage so as to maintain the constancy of conditions and minimize any back pressure upon the charging mixture. In actual operation, depending upon such factors as the concentration and temperature of the acid, the degree of hydrostatic pressure applied on the acid and dust and so forth, an autoclave of a capacity of ten tons may be charged in less than three minutes.

After the receiving stage has been charged with the desired amount of material, which constitutes the total quantity of acid and dust in the acid tank and hopper respectively, the control valve in the discharge line from the spout is closed. This, it will be noted, seals off the autoclave. The conditions within the autoclave are then controlled and maintained to insure a thorough conversion of the material. It has been found in practice that the pressure under which the reaction takes place is extremely important.

As a result of numerous experimental tests, it has been ascertained that it is highly desirable to maintain substantially the generated pressures during the early stages of the digestion period. These pressures may extend over a considerable range, depending upon the character of the raw material and the resulting quantity of generated gases and vapors. In ordinary circumstances the operative pressures during the early part of the conversion stage may range from between twenty-five and fifty pounds. In the event that excess pressure is generated, this may be relieved either by operation of the vacuum pump or by opening a release valve suitably positioned on the autoclave.

After the conversion reactions have proceeded for a period of time, the pressure within the autoclave may be reduced. In the usual operation, however, this reduction in pressure should not be done until the mass within the autoclave has been maintained in agitated condition for a period of time not less than ten minutes or more. This necessity for relatively high pressures in the early stages of the digestion period appears to be due to the fact that the high pressures tend to retard the reactivity of the mass and to maintain fluidity by largely checking the formation of solid end products. In addition to this, it is probable that the high pressures, by restricting the volatilization of the fluid constituents, tends to maintain the mass in a better mechanical mixable condition. As described in the copending application above referred to, the digestion of the materials may be accelerated by utilizing applied heats.

After the material has been converted, the conditions within the autoclave may be adjusted to cause crystallization and drying, as explained more fully in application Serial No. 393,853, filed Sept. 19, 1929.

In the present operation, it will be understood that the acid dust ratio admitted to the charging zone may be regulated for any given run by adjustment of the ring 24 in the manner hereinbefore described. As pointed out above, the scale on the flange 9' may be suitably calibrated so as to facilitate an accurate adjustment of the acid opening.

Numerous tests have proven that the described apparatus is especially adapted to the performance of the process. The provision of means for extenuating the solid stream of acid into a relatively thin film or spray and thereby achieving maximum utilization of the surface area of the reactive ingredients greatly accelerates the process. The provision of a deflector in the path of the mixed or compounded ingredients insures, as pointed out above, an increased turbulence and additional mixing action.

The process performed by the apparatus described compares most favorably with older methods of procedure. Whereas in the usual den process it required, assuming one remilling operation, approximately three months to prepare a satisfactorily cured and dried product, with the present apparatus it is possible to prepare a very desirable product in approximately two hours. Furthermore, due to the optimum conditions under which the process is carried out, it is possible to run a given autoclave for 2,000 tons without cleaning the incrustations. This would seem to be due to the complete utilization of the acid resulting in part from the provision of compounding the acid and dust, in the charging device, in substantially constant and predetermined ratios.

It will be appreciated that while the apparatus and process herein described has been illustrated and exemplified in its use in making phosphatic fertilizers, it will be understood that it is of much wider utility than this. For example, it may be employed in the mixing of cement with water, in making a concrete, or in other operations where it is desired to incorporate a solid with a liquid material under the conditions of intimate mixture and dispersion.

The apparatus herein disclosed is claimed in our application, Serial No. 528,918.

While there has been described an improved process of and apparatus for preparing phosphatic fertilizers, it is to be clearly understood that these are given merely for purpose of explaining the underlying features of the invention. In the nature of the steps and elements employed it is apparent that they are susceptible of a wide range of modification. Furthermore, it is manifest that the process and apparatus are suitable for manufacturing many different types of fertilizers. For example, it will be appreciated by those skilled in the art that the present method is equally applicable to the production of double super-phosphates, therefore, the acid which is charged may comprise sulphuric acid or phosphoric acid, or if desired, any predetermined mixture of these two.

We claim:

1. A process of manufacturing phosphatic fertilizer comprising instituting streams of acid and phosphatic rock dust, having respectively predetermined and constant rates of flow, extenuating the stream of acid enclosing the dust stream within the stream of acid and then impinging the streams and conveying the mixture in a confined stream out of contact with the atmosphere to a digesting stage.

2. A process of preparing phosphatic fertilizer comprising passing a stream of ground phosphatic material toward a digestion stage, enclosing said stream with an impinging stream of acid and deflecting the flow of the combined stream to increase the turbulence thereof and then conveying the stream while maintained under conditions to prevent evaporation of moisture therefrom and the setting of the components of the stream to a digestion stage wherein the reaction is completed.

3. A process of preparing phosphatic fertilizer comprising passing a stream of ground phosphatic material having a predetermined rate of flow toward a digestion stage, enclosing said dust stream with a stream of acid likewise having a predetermined rate of flow, impinging the acid stream on the dust stream and transporting the mixed stream to the digestion stage and maintaining the mixture in an unset condition during transportation of the mixture to the digestion stage by preventing exposure and evaporation of moisture from the mixed stream.

4. A process of manufacturing phosphatic fertilizer comprising instituting streams of acid and phosphatic rock dust, having respectively predetermined and constant rates of flow, extenuating the stream of acid enclosing the dust stream within the stream of acid and then impinging the streams, conveying the mixture in a confined stream out of contact with the atmosphere to a digestion stage, and digesting the mixture under superatmospheric pressure to maintain it in an unset condition until completion of the reaction.

5. A process of preparing phosphatic fertilizer comprising passing a stream of ground phosphatic material having a predetermined rate of flow toward a digestion stage, enclosing said dust stream with a stream of acid likewise having a predetermined rate of flow, impinging the acid stream on the dust stream and transporting the mixed stream to the digestion stage, maintaining the mixture in an unset condition during transportation of the mixture to the digestion stage by preventing exposure and evaporation of moisture from the mixed stream, and digesting the mixture under superatmospheric pressure to maintain it in an unset condition until completion of the reaction.

In testimony whereof we affix our signatures.

BEVERLY OBER.
WILLIAM W. PAGON.
GEORGE L. PRUETT.
WILLARD W. TROXELL.